INVENTORS
GEORGE E. SLEIGHTER
ROY W. YUNKER
ATTORNEYS

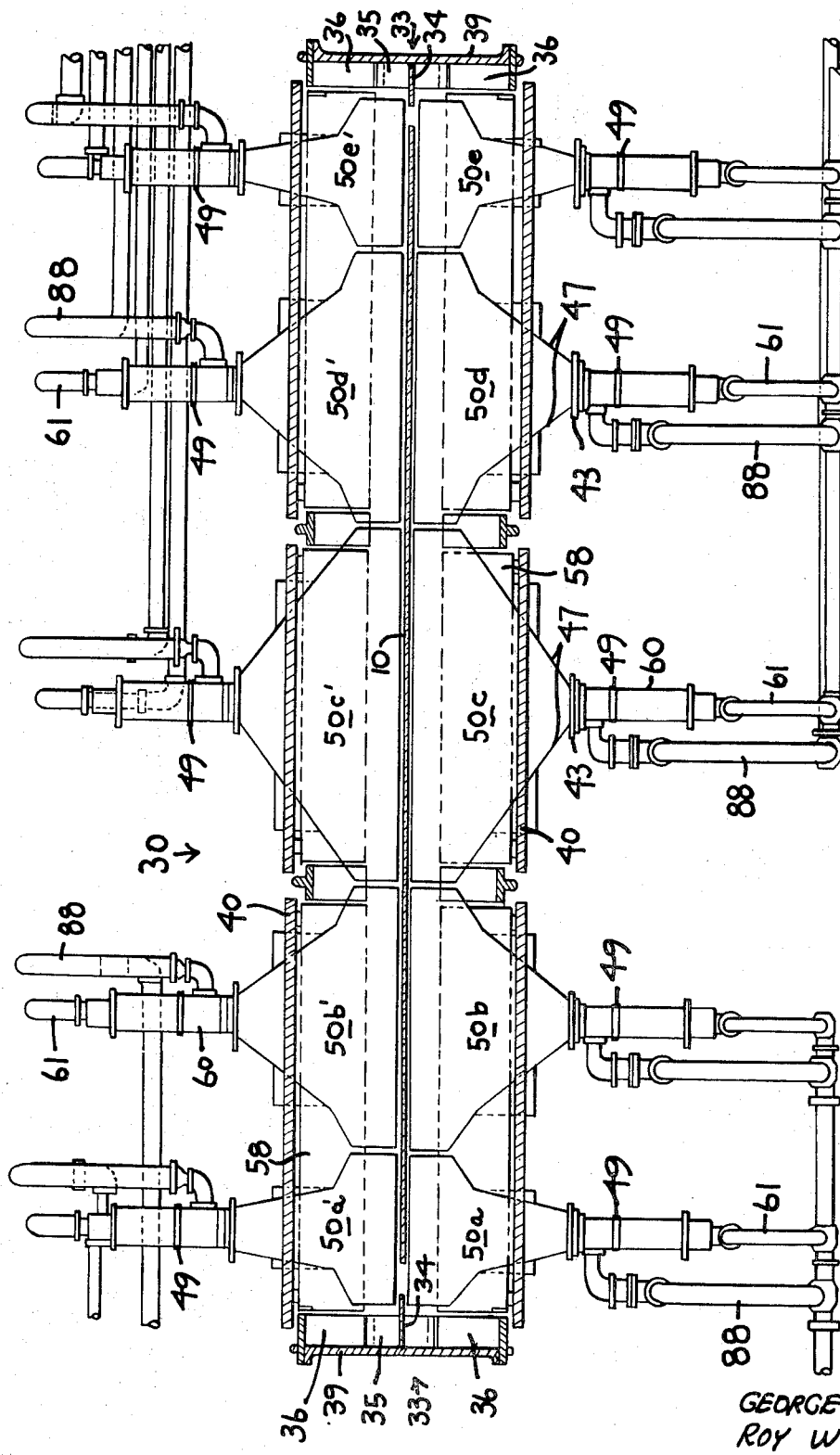

Feb. 16, 1971     G. E. SLEIGHTER ET AL     3,563,719
SHEET GLASS DRAWING METHOD AND APPARATUS
Filed Oct. 2, 1967     3 Sheets-Sheet 3
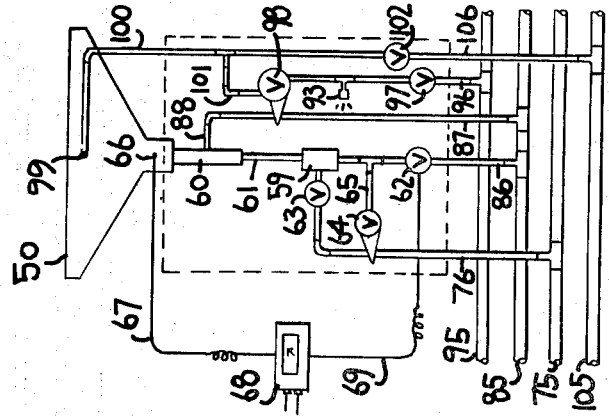
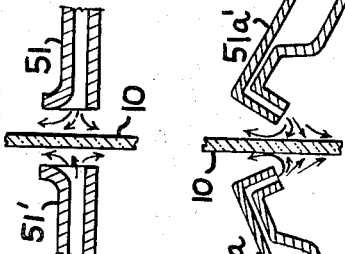
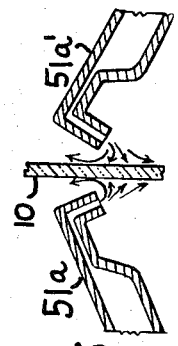
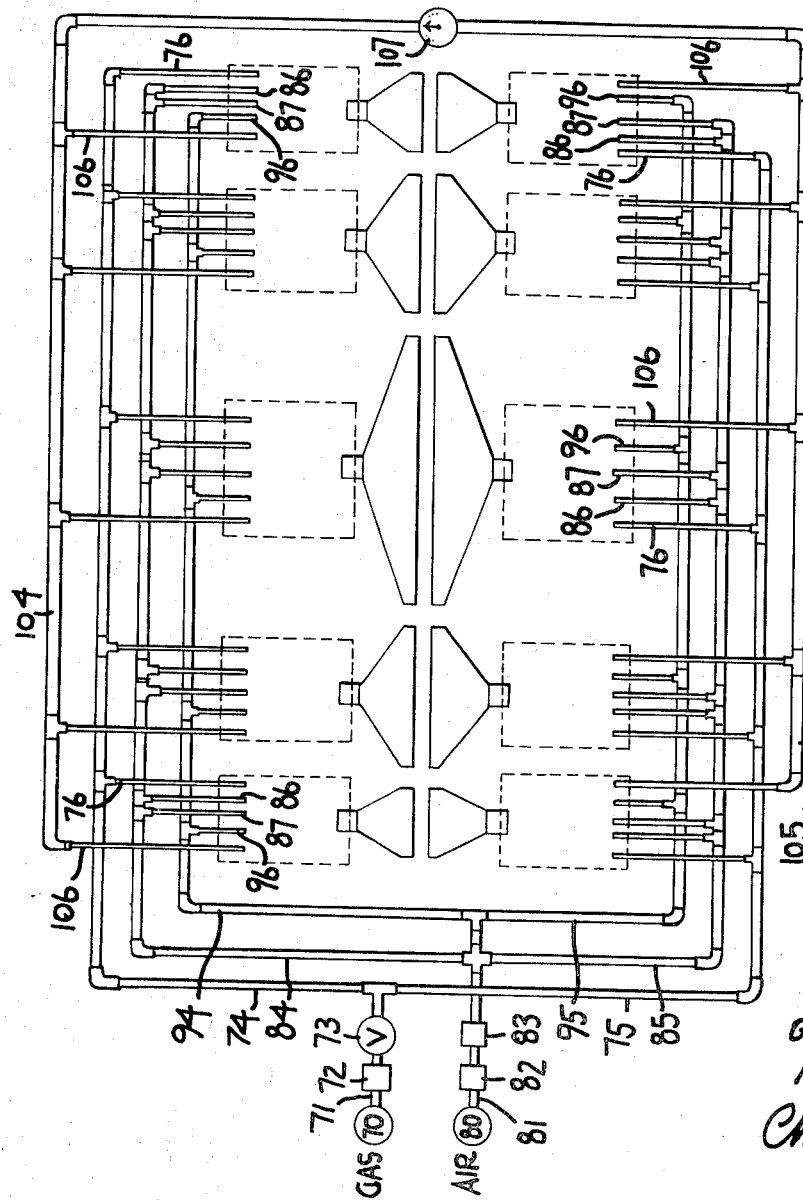
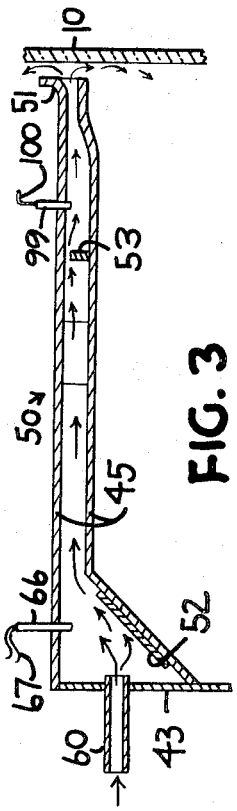
INVENTORS
GEORGE E. SLEIGHTER
ROY W. YUNKER
ATTORNEYS

United States Patent Office 3,563,719
Patented Feb. 16, 1971

3,563,719
SHEET GLASS DRAWING METHOD AND APPARATUS
George E. Sleighter, Natrona Heights, and Roy W. Yunker, Verona, Pa., assignors to PPG Industries, Inc., a corporation of Pennsylvania
Filed Oct. 2, 1967, Ser. No. 672,378
Int. Cl. C03b *15/12*
U.S. Cl. 65—95                        9 Claims

ABSTRACT OF THE DISCLOSURE

Method of and apparatus for pressurizing the drawing chamber in a sheet glass drawing process and controlling the temperature of a sheet of glass being drawn from the chamber through an enclosed drawing machine. Plenum chambers are positioned above the drawing chamber to discharge a substantially continuous, uniform flow of gaseous fluid at a controlled temperature toward each surface and across the full width of the sheet of glass. The gaseous fluid increases the pressure of the drawing chamber, controls the temperature of the glass sheet, and provides a gaseous barrier which substantially eliminates the natural convective flow of air currents between the drawing chamber and the enclosed drawing machine.

BACKGROUND OF THE INVENTION

This invention relates to the continuous manufacture of sheet or window glass wherein a ribbon of glass is drawn from a bath of molten glass in a drawing kiln of a glass melting furnace. In the Pittsburgh or Pennvernon process, to which the present invention is specifically directed, a sheet of glass is formed at the surface of the molten glass and drawn vertically through a drawing chamber and an enclosed drawing machine wherein the glass is cooled through its annealing range.

In the Pittsburgh process, as well as other processes for vertically drawing a sheet of glass, a natural stack is induced by the temperature of the glass in the drawing chamber and the geometry of drawing chamber. In the drawing chamber heat transfer between the glass at an elevated temperature and the cooler ambient air produces a convective flow of air in the direction of the draw and out of the drawing chamber. The movement of heated air out of the drawing chamber results in zones of reduced pressure at the base of the glass sheet. Colder air is drawn to the reduced pressure zones. The colder air may be drawn through cracks in the exterior walls of the drawing chamber or through openings in the enclosed drawing machine. In the latter instance, the colder air flows down along the edges of the glass sheet into the drawing chamber where it is heated and rises adjacent the surfaces of the glass sheet.

The natural stack effect when uncontrolled is detrimental to the drawing process. The convective flow of air currents disrupts the thermal conditions desired in the drawing chamber and the enclosed drawing machine wherein the glass sheet is annealed. In the drawing machine the central portion of the sheet remains hotter than the marginal portions because of the ascending, heated air currents. The colder air currents flowing down along the edges of the sheet cool the edges. This differential cooling produces a non-uniform temperature profile across the width of the sheet which may induce stress patterns that cause the sheet to warp or break in the drawing machine. If the surfaces of the sheet are cooled at different rates, a stress profile may result through the thickness of the sheet which renders the sheet difficult to cut.

The downward flow of colder air currents into the drawing chamber also cools the edges of the glass sheet and the molten glass adjacent thereto in the forming region. This gradual, uncontrolled cooling causes the molten glass adjacent the edges of the glass sheet to devitrify, and after a period of operation generally referred to as a kiln cycle, the process must be interrupted in order that the devitrified glass may be melted.

Moreover, it is generally known that the flow of air currents, particularly colder air currents, adjacent the surfaces of the molten glass sheet in the forming region adversely affects the optical quality of the glass produced. The air entering the drawing chamber may also deposit dust or other particles of foreign matter on the surface of the glass.

Various attempts have been made to control or eliminate the natural convective flow of air currents between the dawing chamber and the annealing lehr. Baffles have been placed in close proximity to the surfaces of the glass sheet as it is drawn out of the drawing chamber to restrict the width of the opening through which the convective currents flow. However, because the temperature of the glass is sufficiently high that the surfaces of the sheet may be marked, some space had to be provided between the edge of the baffle and the surface of the glass sheet in order that such marking would not result. Such a space, no matter how narrow, is of sufficient width to permit the flow of the undesirable air currents. Other efforts which have achieved various degrees of success have involved the selective positioning of heaters and coolers either in the drawing chamber or in the drawing machine enclosure to compensate for the different temperatures of the air currents. Still other efforts have involved pressurizing the drawing chamber as by introducing sufficient air to create an atmospheric pressure that will resist the inward flow of air through the opening through which the glass sheet is drawn as well as any other opening between the drawing chamber and the external atmosphere. See, for example, U.S. Pat. No. 1,726,114 issued Aug. 27, 1929, to W. A. Morton. Although this latter approach prohibits the influx of air into the drawing chamber without further control, it creates turbulence in the forming region. Moreover, when an enclosed drawing machine is positioned above the drawing chamber, an excessive quantity of air is discharged into the enclosed drawing machine which renders the annealing process more difficult to control.

SUMMARY OF THE INVENTION

The present invention comprises a method of and apparatus for pressurizing the drawing chamber by directing a uniform flow of gaseous fluid at a controlled temperature toward each surface of the glass sheet and across the full width of the glass sheet at a level above the opening between the drawing chamber and the enclosed drawing machine so that a portion of the gaseous fluid flows down into the drawing chamber and creates a positive pressure therein. The uniform flows of gaseous fluid extend substantially continuously across the full width of each surface of the sheet to provide a barrier in the form of a gaseous curtain which prohibits the flow of convective air currents between the enclosed drawing machine and the drawing chamber. Moreover, by directing the gaseous fluid downward through the opening between the drawing chamber and the enclosed drawing machine, there is no pressure drop at the opening through which the pressurized atmosphere within the drawing chamber may escape into the drawing machine as with other methods of pressurizing the drawing chamber.

In addition to eliminating the undesirable cooling effects of the erratic air currents, the gaseous fluid flows also provide an effective heat transfer medium which is utilized to control the temperature of the glass sheet. The temperature of each gaseous fluid flow may be adusted through a wide range of temperatures to heat or cool the sheet of glass, or to retard the rate of cooling which would otherwise result in the enclosed drawing machine. In a preferred embodiment, the gaseous fluid flows directed toward each surface of the sheet comprise a plurality of discrete flows of gaseous fluid which are aligned to provide a substantially continuous flow across the full width of the glass sheet. The temperature of each discrete flow of gaseous fluid may be independently adusted to control the temperature profiles across the width and through the thickness of the sheet of glass.

These and other advantages offered by the present invention will become apparent upon further study of the following description of a preferred embodiment of the present invention taken in conjunction with the accompanying drawings.

DESCRIPTION OF THE DRAWINGS

In the drawings, wherein like numerals represent like parts throughout:

FIG. 2 is a sectional plan view of the apparatus of this invention taken along line II—II of FIG. 1;

FIG. 3 is a sectional view of a typical plenum chamber employed in the practice of this invention;

FIG. 4 is a fragmented sectional view illustrating the nozzles of the plenum chambers and the paths of the gaseous fluid flows directed against the opposite surfaces of a glass sheet;

FIG. 5, similar to FIG. 4, illustrates an alternate nozzle structure for directing gaseous fluid toward the surfaces of a glass sheet and the paths of the gaseous fluid flows.

FIG. 6 is a schematic piping diagram showing supply lines for a plurality of plenum chambers arranged in accordance with the embodiment of this invention illustrated in FIG. 2; and FIG. 7 is a schematic piping diagram showing the supply of gases of combustion and air, and controls for a typical plenum chamber illustrated in FIG. 5.

FIG. 1 illustrates a sheet of glass 10 being drawn from a bath of molten glass 12 in the drawing kiln 14 of a glass melting furnace. A draw bar 13 extending transversely of the kiln 14 is submerged in the bath of molten glass 12. Edge heaters 19 are employed to heat the edges of the glass sheet 10 as the sheet is being formed. The glass sheet 10 forms a meniscus 16 at the surface of the bath of molten glass 12 above the draw bar 13 and is drawn upwardly through a drawing chamber 20 and a drawing machine 30.

Molten glass flows from a continuous glass melting tank, not shown, under a shut-off block 15 into the drawing kiln 14. The drawing kiln 14 is defined by the shut-off block 15, a front wall 16, lateral walls 17, conventional L blocks 22, and refractory members 18, positioned between L blocks 22 and the shut-off block 15, and front wall 16. As illustrated in FIG. 1, these various members enclose the drawing kiln 14 from the external atmosphere and the atmosphere above the molten glass in the continuous melting furnace.

Figure 1:
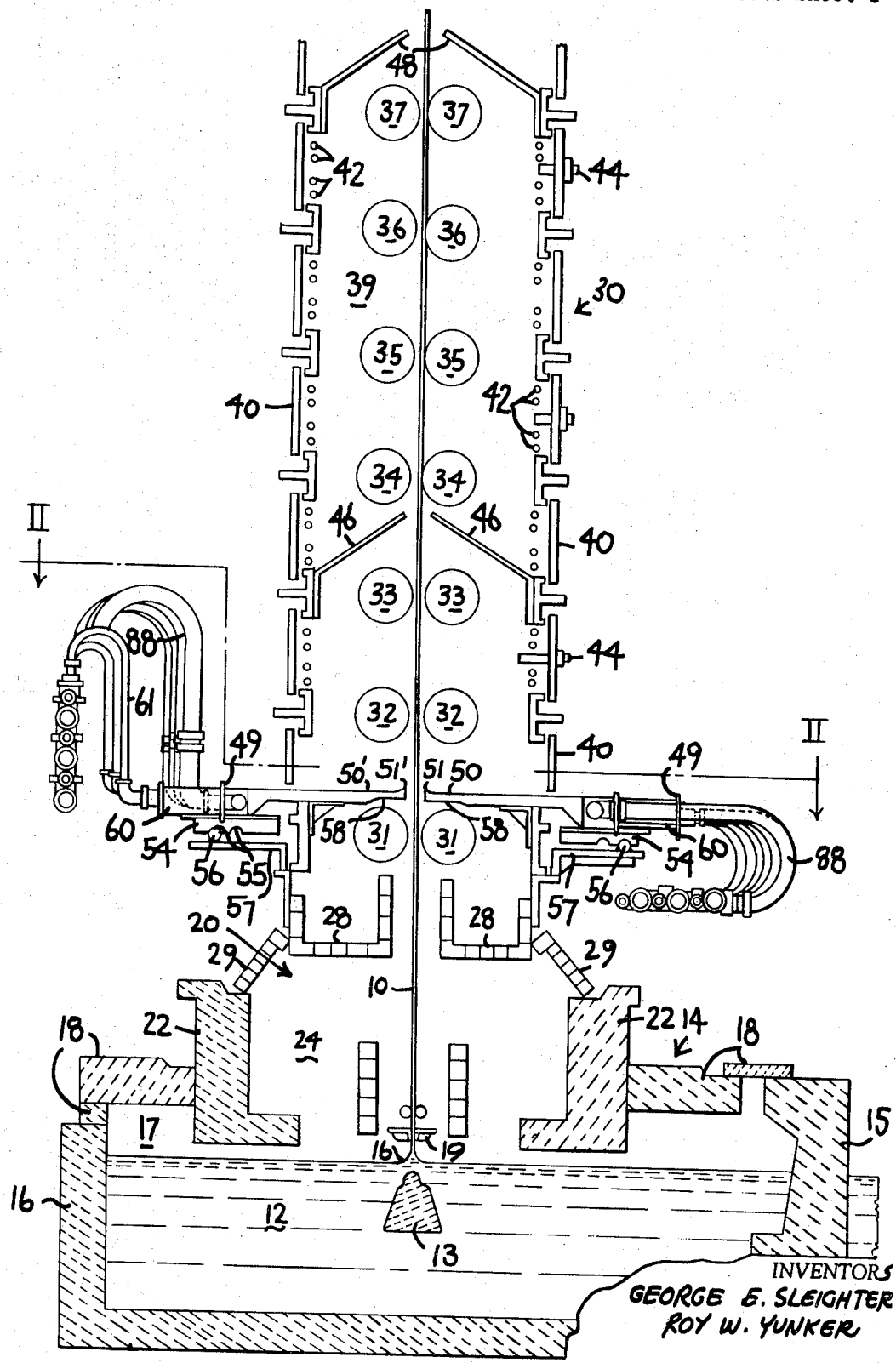
FIG. 1 is a sectional elevation view of a vertical sheet glass drawing process showing the apparatus of this invention positioned within an enclosed drawing machine located above a drawing chamber and drawing kiln of a continuous glass melting furnace.

The drawing chamber 20 is defined by the bath of molten glass 12, conventional L blocks 22, end walls 24, catch pans 28, and refractory members 29 positioned between catch pans 28 and L blocks 22 to seal the drawing chamber 20 from the external atmosphere.

Drawing machine 30 is of a conventional type comprising an enclosure having end walls 39 and a series of pairs of drawing rolls 31 through 37 provided therein for applying tractive forces to draw the sheet of glass 10. Hinged doors 40 are provided on the front and rear walls of the enclosure and may be opened or closed depending upon the rate of cooling desired. Hinged doors 40 may extend continuously across the width of the drawing machine but are preferably divided in three or more sections across the width of the drawing machine to provide for selective introduction of air across the width of the sheet of glass 10. Adjacent each hinged door 40, banks of heating elements 42 may be provided to selectively supply additional thermal energy to the sheet of glass 10 as it is being cooled through the annealing range.

Thermal responsive elements 44 are provided at different levels within the drawing machine 30 to detect the temperature of the sheet of glass at those levels. A plurality of thermal responsive elements are positioned at spaced intervals at each level to provide an indication of the temperature profile across the width of the sheet at that level. At least three thermal responsive elements are usually employed at each level to provide an indication of the temperature of the sheet at the center and at both marginal portions of the sheet.

Baffle plates 46 and 48 fixed to the drawing machine enclosure extend to points closely adjacent the glass sheet 10 just below pairs of drawing rolls 34 and 38. Baffle plates 46 and 48 extend substantially to the end walls 39 of the drawing machine 30 and serve to reduce the convective flow of air currents within the drawing machine and divide the enclosed machine into different vertical sections.

Plenum chambers 50 and 50' are disposed between the pairs of drawing rolls 31 and 32. The ends of plenum chambers 50 and 50' adjacent the major surfaces of glass sheet 10 are fabricated in the form of nozzles 51 and 51' which serve to direct a flow of gaseous fluid toward each major surface of the glass sheet 10.

A burner 60 fixed to the rear wall of each plenum chamber 50 supplies each plenum chamber with gaseous fluid. "Pyro-Jet" burners, manufactured and distributed by Pyronics, Inc., of Cleveland, Ohio, have performed well in the practice of the present invention.

A flexible conduit 61 provides a mixture of combustible gases to each burner 60. A flexible conduit 88 provides an additional quantity of air which is blended with the gases of combustion delivered to each plenum chamber 50. The volume of blend air provided may be varied to adjust the pressure within each plenum chamber 50 and control the flow of gaseous fluid issuing forth from each nozzle 51.

Each burner 60 is attached by means of a yoke assembly 49 to a pair of supporting members 54. Each supporting member 54 is provided with a pair of circular detents 55 spaced several inches apart. Corresponding detents 55 in supporting members 54 are aligned to be positioned over a shaft 56 supported by a pair of brackets 57 fixed to drawing machine 30. The plenum chambers 50 are supported by shelves 58 also fixed to drawing machine 30. The plenum chamber 50 and burner 60 assemblies are thus supported by the shelves 58 and shafts 56 in such a manner that a plenum chamber may be moved from an operative position closely adjacent the surfaces of glass sheet 10, as illustrated in FIGS. 1 and 2, to an inoperative position by lifting the burner 60 to disengage the shaft 56 from one pair of detents 55 and sliding the plenum chamber over the surface of shelf 58 until the shaft 56 engages the other pair of detents 55.

As shown in FIG. 2, a series of five plenum chambers 50a through 50e, and 50a' through 50e', are positioned adjacent each other and opposite each major surface of glass sheet 10. The nozzles 51 of the plenum chambers are aligned to extend across the full width of glass sheet 10.

The plenum chambers are each about 20 inches long and are fabricated to different widths commensurate with the horizontal dimension of the glass sheet each plenum chamber is intended to oppose. In the embodiment shown in FIG. 2, the inner plenum chamber 50c is about 44 inches wide, the end plenum chambers 50a and 50e are each about 18 inches wide, and the intermediate plenum chambers 50b and 50d are each about 34 inches wide. Corresponding prime numbered plenum chambers are fabricated to the same dimensions. Positioned adjacent one another, these plenum chambers provide a total width of 148 inches which is more than adequate to provide a continuous flow of gaseous fluid across the full width of a sheet of glass 120 to 140 inches wide with each of the end plenum chambers directing a flow of gaseous fluid toward an edge of the glass sheet 10.

Plenum chambers of different dimensions may be employed when a glass sheet of greater or lesser width is to be produced, and the number of plenum chambers disposed across the width of the drawing machine may be varied. However, it is preferred to employ a plurality of plenum chambers opposing corresponding horizontal portions of each surface of the glass sheet in order that the temperature of the different horizontal portions of the sheet may be controlled by adjusting the temperature of the gaseous fluid directed toward each horizontal portion of a surface of the glass sheet.

A mechanical edge seal assembly generally denoted by the number 33 is employed to seal each lateral end of drawing machine 30. Each edge seal comprises a plate 34 vertically disposed adjacent an edge of glass sheet 10 and extending a distance of about one inch above and below the flow of gaseous fluid discharged by the end plenum chambers. Plate 34 is welded to a base plate 35 supported by shelves 36 which are fixed to end walls 39 at the same level in the drawing machine as shelves 58. Edge plates 34 extend continuously from a slight distance away from the edges of glass sheet 10 to the end walls 39. In FIG. 2 the end plenum chambers 50a, 50a', 50e, and 50e' are spaced inward from the edges of base plates 35 and shelves 36 for purposes of clarity. In the preferred arrangement the end plenum chambers are positioned to extend over base plates 35 and shelves 36 with the outer edges of the plenum chambers spaced about an inch from the end walls 39. With this arrangement, the flow of gaseous fluid from the end plenum chambers extends continuously across the edges of glass sheet 10, the vertical surfaces of edge plates 34, and terminates a short distance inward of the end walls 39. Base plates 35 and shelves 36 provide a barrier just beneath the level of the gaseous fluid flow which prevents the vertical flow of air currents or gaseous fluid at the lateral ends of drawing machine 30.

FIG. 3 is a sectional view of a typical plenum chamber 50 comprising a rear wall 43, a pair of spaced opposing upper and lower walls 45, and a pair of spaced opposing lateral walls 47 (see especially FIG. 2). The ends of the pair of upper and lower walls 45 spaced from rear wall 43 are parallel and proximate one another, about $1\!/\!16$-inch apart, form a nozzle 51 and provide a slot aperture across the full width of plenum chamber 50. Rear wall 43 is provided with an entrance port through which gases of combustion and blend air from burner 60 are introduced to plenum chamber 50. The pairs of spaced opposing walls 47 and 49 are cut from $1\!/\!8$-inch thick plates of stainless steel alloy No. 308 and welded together to form a continuous airtight passageway or throat through which the gaseous fluid flows from the entrance port to the slot aperture and is discharged toward the glass sheet 10.

Chips and fragments of glass falling through the drawing machine collect on the upper surface of plenum chamber 50. The end of the upper wall of pair of walls 45 is curved upward to form a lip which prevents such particles from falling off the edge of the nozzle 51 into drawing chamber 20.

The lower wall of pair of walls 45 extends outward from rear wall 43 at an acute angle and traverses the flow of gaseous fluid introduced to plenum chamber 50. A fluid impinging plate 52, fixed to the lower wall opposite the entrance port, deflects the flow of gaseous fluid introduced to the plenum chamber and provides a homogeneous mixture of gases in the region of the chamber adjacent the entrance port.

The pair of lateral walls 47 extend outward from rear wall 43 in diverging relationship until the desired width of the chamber is established and then extend parallel to one another for a distance of about 6 inches to the end of nozzle 51. The pair of upper and lower walls 45 are parallel and spaced about $3\!/\!4$ inch apart over a major portion of the distance between the entrance port and nozzle 51, including a distance of several inches wherein the pair of lateral walls 47 are parallel.

The continuous throat of plenum chamber 50 thus comprises a first throat portion of increasing cross-sectional area due to the diverging pair of lateral walls 47, and a second throat portion of substantially uniform cross-sectional area wherein both pairs of opposing walls 45 and 47 are parallel. In that region of the plenum chamber 50 wherein both pairs of opposing walls 45 and 47 are parallel, the pair of upper and lower walls 45 are spaced a relatively short distance apart compared to the distance the pair of lateral walls 47 are spaced apart, i.e., the width of plenum chamber 50.

A baffle plate 53 is provided in that region of plenum chamber 50 wherein both pairs of opposing walls 45 and 47 are parallel. Baffle plate 53 is a $1\!/\!8$-inch thick stainless steel plate fixed to the bottom wall of plenum chamber 50. Baffle plate 53 extends continuously between the pair of lateral walls 47 and to a distance of approximately $1\!/\!16$-inch from the interior surface of the upper wall of the chamber. This arrangement provides a restriction in the throat portion of substantially uniform cross-sectional area which creates turbulence on the upstream side of the restriction and produces a region of uniform gaseous fluid pressure in that region of the plenum chamber 50 between the baffle plate 53 and nozzle 51. This region of uniform gaseous fluid pressure interior of the nozzle 51 produces a uniform flow of gaseous fluid across the full width of the slot aperture of nozzle 51. Other baffle arrangements such as an apertured plate or a plurality of spaced plates could, of course, be substituted for baffle plate 53 to impede the flow of gaseous fluid and provide a region of uniform pressure interior of nozzle 51.

The exhaust aperture of nozzle 51 is formed with the upper and lower walls 45 parallel for a short distance, for example, $1\!/\!4$ to $3\!/\!4$ inch to provide a unidirectional flow of gaseous fluid through the slot aperture.

A thermocouple 66, inserted through the upper wall of plenum chamber 50, is positioned inside the chamber opposite the port through which the gases of combustion and blend air are introduced and provides an indication of the temperature of the gaseous fluid being introduced. An electrical lead wire 67 attached to thermocouple 66 and connected to a temperature recorder-controller not shown provides a visual indication of the temperature of the fluid and, in cooperation with other associated controls, provides automatic control of the temperature of the gaseous fluid being introduced to plenum chamber 50. A pressure probe 99 is provided in the region of uniform gaseous fluid pressure of plenum chamber 50. A conduit 100 transmits gaseous fluid from pressure probe 99 to other control components not shown in FIG. 3.

FIG. 4, an enlarged, fragmented sectional view of nozzles 51 and 51' and glass sheet 10, illustrates the paths of flow of the gaseous fluid directed toward each surface of the glass sheet. Turbulence created at the surface of the glass sheet 10 divides the gaseous fluid directed toward each surface of the glass sheet into two components. One component flows downward along each surface of the glass sheet and provides a source of gaseous fluid which increases the pressure of the drawing chamber. The other component flows upward and this component and the turbulence created at the glass surface provide a gaseous barrier which prevents the flow of gaseous currents from regions adjacent the glass sheet on one side of the nozzles 51 and 51' to regions adjacent the glass sheet on the other side of the nozzles.

The component of gaseous fluid flowing downward continues until the pressure in the enclosed regions adjacent the surface of the glass sheet 10 below the nozzles 51 and 51', i.e., the drawing chamber, is sufficiently great to resist the downward flow. As the pressure in the drawing chamber increases to the desired level, the pressure head resists the downward flow of gaseous fluid except for a small quantity of fluid necessary to make up for gaseous fluid that is exhausted or otherwise lost to the system in the lower regions.

FIG. 5, similar to FIG. 4, illustrates an alternate nozzle structure and arrangement for directing a flow of gaseous fluid toward each surface of a glass sheet 10. In FIG. 5 the nozzles 51a and 51a' are arranged to direct the gaseous fluid downward at an acute angle toward the regions of the drawing chamber to be pressurized. As with the nozzle structure of FIG. 4, gaseous fluid flows downward until the pressure of the lower regions is sufficiently great to resist the gaseous fluid flow. The increased pressure diverts the downward fluid flow by causing the fluid to flow upward thereby providing a gaseous barrier similar to that previously described.

The nozzle structure of either FIG. 4 or FIG. 5 may be employed in the practice of the present invention. Gaseous fluid directed in a path normal to the surface of the glass sheet produces a greater degree of turbulence at the glass surface which disrupts the boundary layer of air adjacent the surface and increases the effective rate of heat transfer between the gaseous fluid and the glass sheet.

FIGS. 6 and 7 schematically illustrate a suitable gaseous fluid supply and control system for the plenum chambers illustrated in FIG. 2. FIG. 6 is a schematic piping diagram which illustrates the main supply lines provided for each plenum chamber assembly 50. FIG. 7 schematically illustrates the piping and controls employed for a typical plenum chamber assembly as represented by the boxes illustrated by broken lines in FIG. 6.

Natural gas from a common source 70 is piped from the source through a main gas line 71 equipped with a pressure regulator 72 and a valve 73. Two feed lines 74 and 75 divide the flow of gas from the main gas line 71 and supply each of the plenum chamber assemblies via unit feed lines 76.

Air from a common source 80 is piped from the source through a main air line 81 equipped with a filter 82 and a blower 83. Two feed lines 84 and 85 first divide the flow from the main air line 81 and supply each of the plenum chamber assemblies with equal air pressure via unit feed lines 86 and 87. The flow of air from the main air line 81 is further divided into two additional feed lines 94, 95 which provide each of the plenum chamber assemblies with equal air pressure via unit feed lines 96.

A pressure gauge 107 is provided for visual observation of the plenum pressure in any one of the several plenum chambers. Gaseous fluid from a plenum chamber passes through plenum pressure control line 106 and then through pressure control feed line 104 or 105 to the pressure gauge 107.

Referring now to FIG. 7, air unit feed line 86, and gas unit feed line 76, are connected to an aspirator-mixer 59 which provides a suitable mixture of combustible gases to burner 60 through a flexible hose 61. A motor driven valve 62 provided in air unit feed line 86 adjusts the flow of air to the aspirator-mixer 59. Gas unit feed line 76 is provided with a valve 63 which is adjusted to provide a proper mixture of combustible gases. After a combustible mixture of gas and air is obtained, diaphragm operated zero pressure regulator valve 64 moderates the flow of gas to aspirator-mixer 59 in response to changes in the quantity of air passed by motor driven valve 62. Regulator line 65 provides a pressure head on one side of the diaphragm of pressure regulator 64. The pressure head varies in accordance with the quantity of air passing through motor driven valve 62 and regulates the quantity of gas delivered to aspirator-mixer 59 to maintain a combustible mixture of gases.

Air unit feed line 87 provides an additional quantity of air which is blended with the gases of combustion delivered by burner 60 to the plenum chamber to maintain the plenum chamber pressure at some predetermined level. Air from unit feed line 87 passes through a zero pressure regulator 98 and then through blend air feed line 88 to burner 60. The quantity of blend air provided to burner 60 is controlled by zero pressure regulator 98. Pressure probe 99 located in the equalized pressure region of the plenum chamber 50 transmits gaseous fluid by means of conduits 100 and 101 and establishes a pressure head equal to that in the plenum chamber on one side of the diaphragm operating pressure regulator 98. An additional pressure head is established on the other side of the diaphragm of regulator 98 by the air delivered by air unit feed line 96. Air unit feed line 96 is provided with a bleed orifice 93 which provides a drop in the pressure in line 96, and a valve 97 which can be adjusted to vary the pressure on the said side of the diaphragm of regulator 98. There is thus provided a constant pressure head equivalent to that existing in the plenum chamber 50 on one side of the diaphragm and a pressure head which may be manually adjusted on the other side of the diaphragm of pressure regulator 98. Initially, this latter pressure is adjusted by means of valve 97 to bias the diaphragm and provide the quantity of blend air necessary to establish a predetermined pressure in plenum chamber 50. A valve 102 is provided in plenum pressure control line 106 which is normally closed for all of the plenum chamber assemblies but may be opened to provide an indication of the pressure in any single plenum chamber assembly on pressure gauge 107. Once the desired pressure is established in plenum chamber 50 by means of valve 97, deviations from the desired pressure are automatically compensated for by reason of the change in pressure detected by probe 99 which varies the pressure head on one side of the diaphragm of pressure regulator 98 and permits either a greater or lesser quantity of blend air to pass through the regulator thereby returning the pressure to the desired level.

Theremocouple 66 provided just inside the port through which the gases of combustion are introduced to the plenum chamber 50 is connected by means of electrical lead wire 67 to a recorder-controller 68. The electrical power supply for motor operated valve 62 is provided through recorder- controller 68 by means of electrical lead wire 69. Recorder-controller 68 is manually set at a predetermined temperature. Then, in response to deviations from that temperature, as detected by thermocouple 66 and transmitted by means of electrical lead wire 67 to recorder-controller 68, the recorder-controller moderates the power supplied to motor operated valve 62 by means of lead wire 69 to pass either a greater or lesser quantity of air to the aspirator-mixer 59 and return the temperature of the gases of combustion to the desired temperature.

OPERATION OF A PREFERRED EMBODIMENT

The foregoing discussion of the accompanying drawings describes the apparatus of a preferred embodiment of this invention as employed in a conventional sheet glass drawing process. The following is an example, by way of illustration only, of the operation of the previously-described preferred embodiment of this invention.

The plenum chambers are disposed between the first and second pairs of drawing rolls with their nozzles closely adjacent the surfaces of the glass sheet and aligned to extend across the full width and beyond the edges of the glass sheet terminating about an inch from each end wall of the enclosed drawing machine. The nozzles of the plenum chambers may be spaced a distance of ½ to 2 inches away from the surfaces of the sheet and are preferably spaced about 1 inch from the surfaces of the sheet. A minimal spacing of ½ to ¾ inch is recommended to allow for changes in the position of the glass sheet and for passage of "stones" in the sheet. At spacings greater than about 2 inches, the plenum chambers may be utilized to control the temperature of the glass sheet but the gaseous barrier and pressurization of the drawing chamber are not so effective as at the closer spacings. Although it is preferred that the nozzles be uniformly spaced from the surfaces of the sheet, spacing differences of about ⅜ inch with respect to adjacent nozzles may be tolerated without compensation. Adjacent nozzles are preferably spaced ¼ to ½ inch apart. The turbulence created by the gaseous fluid flows issuing forth from adjacent nozzles bridges the space between the nozzles and provides an effective seal between the discrete flows of gaseous fluid.

Air and natural gas at a volumetric ratio of about 10:1, and each at a pressure of 18 to 20 ounces per square inch, are mixed and delivered to the burners fixed to the rear walls of the plenum chambers. With the previously described burners the temperature of the gases of combustion introduced to each plenum chamber can be adjusted from about 500° to 1500° Fahrenheit.

The gases of combustion and blend air delivered to each plenum chamber are adjusted to provide a plenum pressure of about 0.58 ounce per square inch and a gaseous fluid temperature of about 1000° Fahrenheit. This produces a unidirectional, uniform flow of gaseous fluid of about one cubic foot per inch of nozzle width per minute across the full width of each plenum chamber. This flow rate produces a positive pressure in the drawing chamber and provides a substantially continuous gaseous barrier across the full width of the glass sheet which substantially eliminates the convective flow of air currents between the drawing chamber and the regions of the drawing machine above the plenum chambers.

For example, with the plenum chambers in operating position but with no gaseous fluid being supplied thereto, the drawing chamber pressure averaged about —0.020 ounces per square inch. When the plenum chambers were first placed in operation, the drawing chamber pressure increased suddenly to 0.008 ounce per square inch and the edges of the sheet heated within minutes to the point where it was necessary to turn off the edge heaters and re-adjust other heaters normally employed to control the temperature of the edges of the glass sheet.

Drawing chamber pressures obtained in other trials with the plenum chambers uniformly adjusted to different pressures are set forth in Table I.

TABLE I

Pressures in ounces per square inch

| Plenum chamber: | Drawing chamber |
|---|---|
| 0.1156 | —0.0162 |
| 0.1734 | —0.007 |
| 0.2890 | 0.000 |
| 1.0894 | 0.023 |

Smoke tests conducted during these trials showed a marked reduction in the natural stack effect. Down drafts at the lateral ends of the machine were substantially eliminated and the up-draft at the center of the sheet was noticeably reduced. When the plenum chamber operation was terminated, the drawing chamber pressure dropped to a negative value and the edges of the sheet cooled rapidly.

Increasing the temperature of the edges of the sheet in the forming region produced a more stable kiln operation. This improvement is attributed to the elimination of the colder air currents which normally flow down along the edges of the sheet from the drawing machine into the drawing chamber. The drawing machine was operated at an increased speed during these trials and the number of breaks occurring in the drawing machine was reduced. Moreover, at the end of the normal kiln cycle during which these trials were conducted, it was observed that the quantity of devitrified glass adjacent the edges of the sheet in the forming region was not nearly so great as that previously experienced.

Although some latitude exists, the convective flow of air currents is minimized when sealing is uniform across the width of the glass sheets.

A uniform seal is obtained by adjusting the pressure and/or temperature of the gaseous fluid supplied to each plenum chamber to produce a uniform flow of gaseous fluid across the full width of each surface of the glass sheet. Unbalanced operation, either front-to-back or side-to-side, does not drastically affect drawing chamber pressure, but the sealing characteristics are affected.

The virtual elimination of infiltration of cold air and dirt into the drawing chamber is another important advantage obtained by operating the drawing kiln at a pressure greater than atmospheric pressure. This was dramatically demonstrated by operating the drawing kiln with an opening in the kiln housing measuring several square inches in area. Kiln conditions did not change significantly during a six-hour period of operation with the exception of a slight increase in the temperature of the glass in the vicinity of the opening. The temperature increase was attributed to the movement of air out of the kiln which brought hotter air into contact with the glass in the vicinity of the openings. Further evidence of the pressurized drawing chamber's ability to tolerate leaks was provided by smoke tests that showed there was no influx of air into the drawing kiln through relatively large cracks in the kiln housing.

The temperature of the glass sheet adjacent the plenum chamber nozzles is approximately 1100° Fahrenheit. The temperature of the ambient air at this level in the closed drawing machine is about 900° Fahrenheit. In the preferred operation, the gaseous fluid is employed to retard the rate of cooling of the glass sheet by maintaining the temperature of the gaseous fluid intermediate the temperatures of the glass and the ambient air. In addition, the temperatures of the discrete flows of gaseous fluid issuing forth from adjacent nozzles are adjusted to different temperatures to differentially retard the rates of cooling of transverse portions of the glass sheet to compensate for the temperature profile across the width of the sheet and control this temperature profile in some predetermined manner.

For example, in the Pittsburgh process, the marginal portions of the sheet cool more rapidly than the central portion of the sheet and the edges of the sheet are normally hotter than the marginal portions of the sheet. For purposes of this invention, one-fourth to one-third of the width of the sheet measured in from the edge of the sheet comprises a marginal portion of the sheet. To provide a more uniform temperature profile, the temperature of the gaseous fluid issuing from the center, intermediate, and end nozzles of the plenum chambers on both sides of the glass sheet would be adjusted to about 1000°, 1100°, and 1040° Fahrenheit, respectively. In order to provide a uniform seal across the full width of the glass sheet, the plenum chamber pressures are varied slightly to compensate for the different temperatures of the discrete flows of gaseous fluid.

Temperature differentials as great as 50° Fahrenheit between adjacent horizontal portions of a glass sheet have been produced by independently varying the temperature of the discrete flows of gaseous fluid directed toward those portions of the glass sheet.

It should be noted that the previously stated advantages were obtained without adverse effect in the enclosed drawing machine due to the uncontrolled escape of pressurized gaseous fluid from the drawing chamber. This is attributed to the introduction of the gaseous fluid through the opening between the drawing chamber and the enclosed drawing machine which prohibits the backflow of gaseous fluid to the enclosed drawing machine. If the gaseous fluid were introduced through some other opening, the pressure drop between the drawing chamber and the enclosed drawing machine would cause the gaseous fluid to exhaust into the machine. Such exhaust would create erratic air currents and turbulence in the drawing kiln and drawing machine which would adversely affect the forming and annealing operation.

Although a single set of plenum chambers positioned between the first and second pair of drawing rolls in the drawing machine has been described, it should be understood that the plenum chambers could be positioned at a different level in the machine to provide the advantages previously set forth. However, it is preferred that the plenum chambers be positioned at a level low in the drawing machine to provide a gaseous barrier between the drawing chamber and a major portion of the drawing machine.

An additional set of plenum chambers may also be positioned at a different level in the machine to operate in conjunction with the apparatus described. For example, a set of plenum chambers similar to that previously described may be disposed on opposite sides of the glass sheet between the second and third pair of drawing rolls to provide an additional gaseous barrier which further restricts the convective flow of air currents within the drawing machine, and an additional means of controlling the temperature profiles across the width and through the thickness of the glass sheet as the glass sheet is cooled through its annealing range.

OTHER EMBODIMENTS

Although the present invention has been described with specific reference to a conventional process for drawing sheet glass, it is not limited thereto and may be employed in other glass processes.

In general, the present invention provides a method of and apparatus for producing a pressure differential between regions exposed to adjacent portions of a surface of a glass sheet by directing a uniform flow of a gaseous fluid toward the surface of the sheet at such an angle that a portion of the gaseous fluid provides a source of fluid which produces the desired pressure differential and the flow provides a barrier in the form of a gaseous curtain which maintains the established pressure differential and prohibits the flow of currents from one region to the adjacent region. The gaseous fluid flow is substantially continuous along the boundary between the regions of different pressure so there will be no appreciable discontinuities through which the gaseous fluid from the pressurized region may escape to the region of lower pressure. The temperature of the gaseous fluid directed toward the glass sheet is preferably controlled so that heat transfer between the gaseous fluid and the glass at the area where the gaseous fluid impinges against the sheet, or is in closest proximity to the surface of the glass sheet, is such as to control the temperature in some predetermined fashion.

The effective heat transfer between the gaseous fluid and the surface of the glass sheet can be varied by changing the temperature of the gaseous fluid, the rate of flow of the gaseous fluid, and/or the angle of the path of the gaseous fluid with respect to the surface of the glass. As previously described, the greatest degree of heat transfer is attained when the flow is directed in a path normal to the surface of the glass.

The pressure differential between the regions exposed to adjacent portions of the glass sheet can be varied by adjusting the rate of flow of the gaseous fluid and/or controlling the rate at which the pressure is permitted to dissipate on either side of the impinging flow of gaseous fluid. When the chief concern is to provide a pressure differential and gaseous barrier between regions exposed to adjacent portions of a glass sheet, it is preferred to direct the fluid flow in a path that forms an acute angle with respect to the surface of the glass, with the path being in the direction of the region of greater pressure. Once the pressure differential is established, the greater pressure causes the fluid flow to turn and flow in the direction of the region of lower pressure where it may be exhausted by appropriate means.

It should be noted that only one of the regions exposed to the adjacent portions of the glass sheet must be enclosed to maintain the pressure differential. If the other region is to remain at atmospheric pressure, it need not be enclosed unless it is desired to control the atmospheric adjacent the sheet, the ambient temperature, or the temperature of the sheet in that region. However, it is usually preferred to provide a pressure differential between adjacent regions within an enclosure or between regions defined by separate but adjacent enclosures having a common wall and an opening therethrough.

Depending upon the nature of the treatment being affected on the glass sheet and the degree of control or purity required of the atmosphere through which the glass is conveyed, the gaseous fluid flow may be the same as or different from the gaseous atmosphere in the adjacent regions. Preferably, the gaseous fluid and the adjacent atmospheres are of the same composition. If the region of greater pressure is to be a controlled atmosphere, for example, an oxidizing, inert, or reducing atmosphere, the gaseous fluid providing the pressure differential should be of the same composition so as not to adversely affect the treatment or control required.

The turbulence created when the fluid flow impinges on the glass surface or the boundary layer of air adjacent thereto causes a slight mixing and entrainment of the gaseous content of the adjacent regions of different pressures. This usually results in the entrained flow of a small quantity of the gaseous atmosphere from either or both of the adjacent regions to the other region. Thus, if atmospheric control is critical, the adjacent region of lower pressure should also be of the same composition or type of atmosphere as the gaseous fluid flow. However, if the treatment or atmospheric control can sustain the slight contamination which results from entrainment of the gaseous atmosphere in the region of lower pressure, the atmosphere in this region may be of a different composition than that of the gaseous fluid flow and region of greater pressure.

Although the present invention has been described with reference to certain specific details, it is not intended that such details shall be regarded as limitations upon the scope of the invention except insofar as included in the accompanying claims by which we claim:

1. A continuous method of forming a sheet of glass from a molten glass mass comprising, moving said glass sheet along a linear path through an enclosed region surrounding said glass sheet and the path of movement thereof such that the gas pressure within said region may be elevated, said glass sheet being soft and in a deformable state when it enters said enclosed region, cooling said glass sheet in said enclosed region as said sheet moves therethrough until said glass sheet is no longer in a deformable state, flowing a gas at a uniform rate against a major surface of said glass sheet at a location in said enclosed region where said sheet is no longer in a deformable state thus providing portions of said enclosed region adjacent to and on opposite sides of said location, said flow of gas being directed along a path of flow at an angle to the path of movement of said glass sheet ranging from a path of flow perpendicular to said moving sheet to a path of flow directed toward the portion of the enclosed region wherein said moving sheet of glass is in a deformable state, maintaining a barrier extending from the periphery of said enclosed region to the location from which said gas flows against the major surface of said glass sheet to prevent the flow of gas between said portions of said enclosed region, and applying said flow of gas at said uniform rate of flow across the entire width of said moving glass sheet transversely of the path of movement of said glass sheet and across substantially the entire width of said enclosed region at that location and at a pressure sufficient to raise the gas pressure to above atmospheric in said portion of the enclosed region where said glass sheet is in a deformable state.

2. The method of claim 1 wherein said flow of gas against a major surface of said glass sheet is applied at said location at a pressure sufficient to raise the gas pressure to above atmospheric pressure in each of said portions of said enclosed region whereby the entry of a gaseous fluid from external sources into said enclosed region is prevented.

3. The method of claim 1 wherein said flow of gas against a major surface of said glass sheet is directed along a path of flow at an angle to the path of movement of said glass sheet and in a direction inclined toward the portion of said enclosed region wherein said glass sheet is in a deformable state, and said gas is at a pressure sufficient to maintain the gas pressure in said last named portion of said enclosed region at above atmospheric pressure and a pressure greater than that in the remaining portion of said enclosed region.

4. The method of claim 1 wherein the path of movement of said glass sheet and the enclosed region surrounding said glass sheet are vertically disposed, said gas flowing at a uniform rate is applied to each major surface of said glass sheet at a location in said enclosed region where said glass sheet is no longer in a deformable state and said flowing gas is applied to each major surface of said glass sheet in equal volumes of gaseous fluid flow at a pressure sufficient to increase the pressure in the portion of the enclosed region wherein said sheet is in a deformable state to at least above atmospheric pressure.

5. The method of claim 1 wherein a portion of the flow of gas applied to opposite sides of said glass sheet are heated so as to heat that portion of said sheet to which said heated gas is applied.

6. In an apparatus for vertically drawing a sheet of glass having opposing major surfaces and longitudinally extending side edge portions including a drawing kiln containing a bath of molten glass, a drawing machine above said kiln having front, rear and end walls forming an enclosure for said glass sheet, means in said drawing machine for annealing said glass sheet and means for conveying said glass sheet vertically through said drawing kiln and said drawing machine, the improvement comprising:

plenum means on opposite sides of said glass sheet at a point in said drawing machine where said sheet is no longer in a deformable state and extending through said front and rear walls of said drawing machine transversely across said drawing machine to a location adjacent a major surface of said glass sheet, said plenum means each having an inlet opening remote to the path of movement of said sheet therethrough, gas supply means connected to each said plenum means for supplying gas to said plenum means through said inlet, said plenum means each having a terminal portion provided with a gas outlet aperture located opposite the gas outlet aperture of the terminal portion of the plenum means on the opposite side of said glass sheet, said gas outlet apertures each being substantially coextensive of said terminal portion for supplying a flow of gas at a substantially uniform rate and a pressure above atmospheric pressure along the entire width of said drawing machine and of said glass sheet moving therethrough, said terminal portion having a path of flow at an angle to the path of movement of said glass sheet ranging from a path of flow perpendicular to said path of movement of said glass sheet to a path of flow directed downwardly toward said kiln, and a gas barrier means adjacent each said plenum means extending across said drawing machine from said front, rear and end walls to a point adjacent said plenum terminal portion for preventing the flow of gas between regions above and below said plenum members in an area bounded by said plenum terminal portions and said drawing machine walls.

7. An apparatus as in claim 6 wherein at least two of said plenum means are mounted on each side of the path of movement of said glass sheet, the plenum means on the same side of said path of movement being closely spaced from an adjacent plenum means and positioned so that the path of flow of each of the terminal portions of said adjacent, closely spaced plenum means are at the same angle with respect to said path of movement of said glass sheet.

8. An apparatus as in claim 6 wherein each said plenum means comprises a chamber defined by a closely spaced pair of upper and lower walls, a rear wall having means mounted thereon for providing hot gases to said chamber, and a pair of opposing lateral walls extending from said rear wall to a terminal portion of said chamber having a gas outlet aperture coextensive therewith, said opposing lateral walls being convergent adjacent said rear wall to form an acute angle.

9. An apparatus as in claim 8 wherein each said plenum means is provided with a baffle plate mounted in said chamber on the lower wall thereof and extending continuously between said converging lateral walls, said baffle plate having an upper edge terminating a short distance from said chanber upper wall.

References Cited
UNITED STATES PATENTS

| | | | |
|---|---|---|---|
| 3,241,937 | 3/1966 | Michalik et al. | 65—99 |
| 3,226,217 | 12/1965 | Oxley et al. | 65—95 |
| 3,251,671 | 5/1966 | Gardon | 65—95 |
| 3,355,275 | 11/1967 | Sensi et al. | 65—99X |

ARTHUR D. KELLOGG, Primary Examiner

U.S. Cl. X.R.

65—194, 204